JOSHUA L. PHILLIPS
IMPROVED WIRE ROPE COTTON TIE.

No. 73034

PATENTED
JAN 7 1868

WITNESSES.

INVENTOR.
Joshua L. Phillips

United States Patent Office.

JOSHUA L. PHILLIPS, OF WASHINGTON COUNTY, MISSISSIPPI.

Letters Patent No. 73,034, dated January 7, 1868.

IMPROVEMENT IN COTTON-BALE TIE.

*The Schedule referred to in these Letters Patent and making part of the same.*

TO ALL WHOM IT MAY CONCERN:

Be it known that I, JOSHUA L. PHILLIPS, of the county of Washington, and State of Mississippi, have invented a certain new, useful, and improved Device for Fastening the Ends of Wire Rope together, when the same is used for banding cotton or other bales; and I do hereby declare the following to be a full, clear, and exact description of the same, reference being had to the annexed drawings, making a part of this specification, in which—

Figure 1:
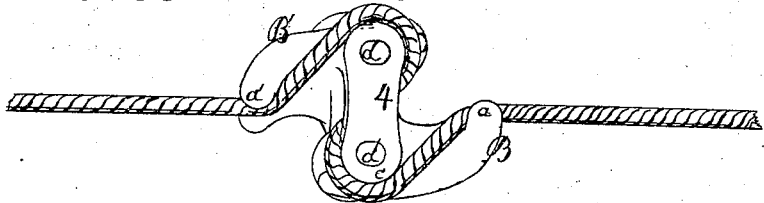
Figure 2:
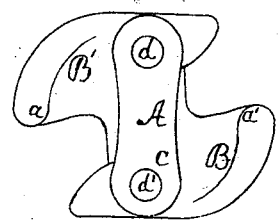
Figure 3:
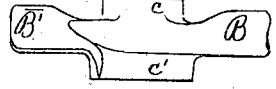
Figure 4:
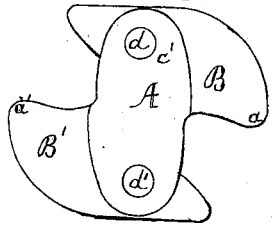

Figure 1 is a perspective view of my device as when fastening the ends of a band of wire rope together, Figure 2 a plan or top view, Figure 3 a side view, and Figure 4 a bottom view of the device as when not in use, or when detached from a band.

Before proceeding to describe my invention, or to indicate the mode of its operation, it is necessary, to a full comprehension of its merits, to refer to the well-known fact that, as to nearly every existing intermediate contrivance for fastening the ends of wire rope or wire bands together, the important objection lies that it is impossible with them to take up the slack of the band in the first place, and, in the second place, to take the band off the bale without cutting the same. The first-named objection results in the evil consequence of a very considerable expansion of the bale after it is withdrawn from the compressing-machine, if not to an irregular or unequal expansion as to different parts of the bale, and a complete distortion of its form. The second objection to which I have referred, as to existing devices, to wit, that it is necessary to cut the bands in order to break up the bale, is even more important than the first, because the bands are so shortened by cutting that they cannot again be used, and of course are permanently lost.

My device is not amenable to either of the objections to which I have adverted. It takes up all the slack of the band, and, notwithstanding that the fastening which it establishes, is entirely firm and secure so long as it is proper to maintain it, when the bale is to be broken up, a very slight manipulation is sufficient to disconnect the device from the band, without the slightest injury to either.

But my invention will be better and more quickly understood by reference to the drawings, upon which A marks the central portion, body, or bar of the device, from which, at both ends, but on opposite sides, project the two wings B B', which are so formed as to be provided, at their points *a a*, with grooves to receive the wire, as shown at fig. 1, after the slack has been taken up, in the manner hereafter shown or described. The bar A has a longitudinal opening or aperture sufficiently large to allow of the introduction of both ends of the band, that being necessary to establish the fastening, and the easy movement of the same backwards or forwards. In order to prevent the weakening of the central bar A in making the opening through it, and at the same time to provide points of support for the wire rope, first during the process of taking up the slack, and afterwards, when the strain which is due to the expansive force of the cotton within the bale comes fully upon the band, the said bar A is made considerably thicker than the wings B B', as is clearly shown at fig. 3, where the upper and lower projections, consequent upon such superior or greater thickness, are respectively marked *c* and *c'*. Upon the outer or upper side of the central bar A, two holes, *d d'*, are made for the reception of an instrument, especially constructed for the purpose, that is necessary, in the operation of turning the device, to take up the slack and secure the fastening. This instrument may consist of a bar of iron, in which two pins are inserted, at such distance apart as that they will enter the holes *d d'*, and of sufficient length, say from ten to fifteen inches, as to give considerable leverage power. The holes *d d'* may extend entirely through the central bar A, as shown at figs. 2 and 4, or they may penetrate very nearly, without quite going through, as seen at fig. 1.

In the actual practice or use of my invention, the operation is as follows, to wit: The wire rope is made to encircle the bale, and both ends of it are passed through the opening in bar A from opposite sides, so that the ends will point in different directions. The operator then draws the band as tight as his strength will allow of, and wraps the ends in reverse convolutions around the portion of the bar A that projects below the plane of the wings B B'. The instrument to which I have referred is now applied, and with it the device is turned, until the points of the wings *a a'* are brought under the band, when the same will at once enter the grooves therein. On withdrawing the instrument, the device will instantly assume the position that is seen at fig. 1. Nor after the bale has been released from pressure will that position be changed, no matter what may be the degree of tension that is put upon the band. The slipping of the bands into the grooves fixes the fastening securely, for the previous partial revolution of the device will have taken up all the slack of the band, and developed a sufficient strain upon it effectually to prevent its slipping out of the grooves.

It will be observed that no acute angle or flexure of the band is necessary or possible in fastening its ends together with my device, and that hence, in addition to the other advantages of which I have made mention, the full normal strength of the band remains unimpaired.

My device may be made of cast or malleable iron, and at as little cost as any other of the same weight. It is, moreover, of easy application to practice, a mere inspection of it being sufficient to indicate the manner in which it is to be used. After the bale has reached its destination, and is to be broken up, all that is necessary is to force the band out of the grooves at the ends of the wings B B', when the tension upon the former will of itself instantly effect a disconnection, without damage to the band or the device.

Having thus described my invention, and its mode of operation, what I claim, and desire to secure by Letters Patent, is—

The device herein described, consisting of the central bar A, when provided with the wings B B', in which, at the points $a\ a'$, are grooves to receive the band, a longitudinal opening for the ends of the band, and holes $d\ d'$, as and for the purpose herein set forth.

JOSHUA L. PHILLIPS.

Witnesses:
S. C. FISHER,
H. N. JENKINS.